(12) United States Patent
Kwan

(10) Patent No.: US 7,726,574 B2
(45) Date of Patent: Jun. 1, 2010

(54) METHOD, DEVICE AND SYSTEM FOR SCANNING OPTICAL CODES

(75) Inventor: Sik Piu Kwan, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 430 days.

(21) Appl. No.: 11/856,993

(22) Filed: Sep. 18, 2007

(65) Prior Publication Data

US 2009/0072036 A1    Mar. 19, 2009

(51) Int. Cl.
*G06K 7/10* (2006.01)
(52) U.S. Cl. .............. 235/462.32; 235/454; 235/462.14
(58) Field of Classification Search ........... 235/454, 235/462.14, 462.23, 462.32, 462.35, 462.36, 235/459
See application file for complete search history.

(56) References Cited

U.S. PATENT DOCUMENTS

| | | | | |
|---|---|---|---|---|
| 6,634,554 B1 * | 10/2003 | Merchant | ............... | 235/462.23 |
| 6,689,998 B1 * | 2/2004 | Bremer | ................... | 250/201.2 |
| 7,070,109 B2 * | 7/2006 | Kato et al. | ............. | 235/462.32 |

* cited by examiner

*Primary Examiner*—Seung H Lee
(74) *Attorney, Agent, or Firm*—Harden E. Stevens, III

(57) ABSTRACT

Apparatuses, methods and systems used to reduce the time needed to process images of a bar code or optical code captured by a image bar code scanner. Image bar code scanners read bar codes or optical codes by capturing digital images of the codes using an image capture device and then processing the captured images to decode the optical code or bar code. The processing time is reduced by rotating the images to align the axis of the codes contained in the captured images with the rows of photo detectors in the image capture device.

22 Claims, 4 Drawing Sheets

METHOD, DEVICE AND SYSTEM FOR SCANNING OPTICAL CODES

TECHNICAL FIELD

An apparatus, method and system described herein relates generally to improvements to image bar code scanners. More particularly, the invention relates to improvements to the processing of an image to decode a bar code or other optical code.

BACKGROUND

Bar code scanners are used in a wide variety of applications that rely on bar codes to store information. Industries such as retail, airline, self service, automotive, parcel delivery, pharmaceutical and healthcare use bar codes to provide inventory control, customer identification, item tracking and many others functions. Bar code scanners scan or read a bar code that is typically attached to or printed on an object. A typical bar code is comprised of a number of bars separated by spaces. Information is encoded on a bar code by varying the width of the bars and spaces. When a bar code is placed within the field of view of a scanner, the scanner will read the bars and spaces comprising the bar code and then use this data to decode the information encoded in the bar code. This operation is called reading a bar code. The information encoded on a bar code usually takes the form of an alphanumeric number.

An imaging bar code scanner reads a bar code by capturing a digital image of the bar code and then processing the image to detect and read the bar code. Processing the image to find a bar code is a very computationally intensive process. In high pass-by applications where the bar code is moved past the scanner at high speeds, the bar code being scanned is physically located within the scanner's field of view for a relatively short period of time. During this short time period, multiple images must be captured and processed. This places limits on the time available to process each captured image. In some situations, there is insufficient time to process a captured image before the next image is captured for processing. Increase the processing power of the scanner is one possible solution but this also adds expense to the scanner. Other solutions simply limit the pass-by speed of the bar code thus allowing more time to process the captured image, which reduces the required processing power. Although, what is needed is a way to reduce the computational requirements needed to analyze a captured image so that no increase in scanner processing power is required and there is no reduction in pass-by speed.

DETAILED DESCRIPTION

In the following description, numerous details are set forth to provide an understanding of the claimed invention. However, it will be understood by those skilled in the art that the claimed invention may be practiced without these details and that numerous variations or modifications from the described embodiments are possible.

Figure 1:
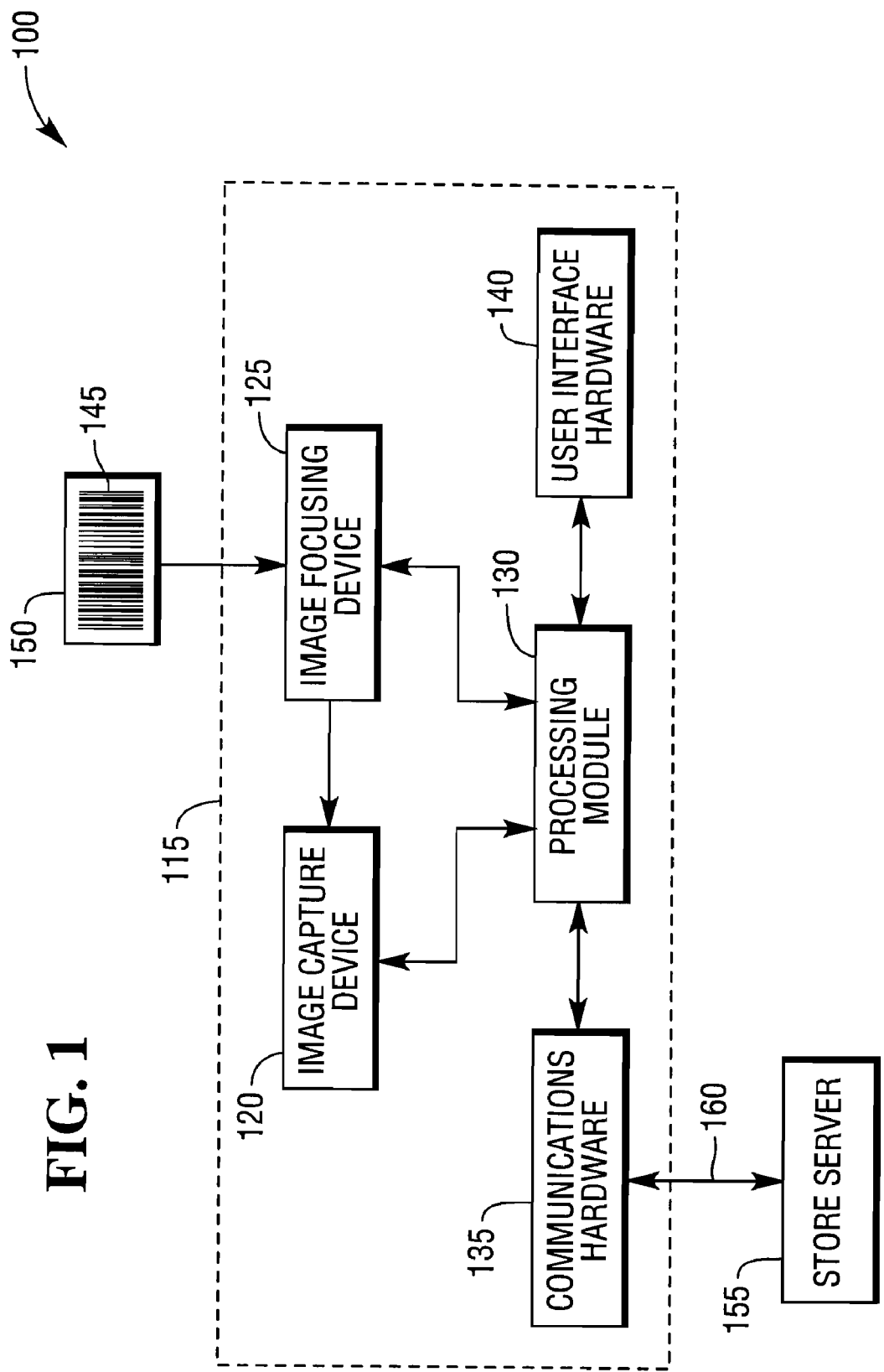
FIG. 1 is an illustration of an embodiment of an image scanning system.

Referring now to FIG. 1, there is provided a high level illustration, in block form, of an embodiment of an image scanning system 100, which is used to scan a bar code 145. The image scanning system 100 comprises an image scanner 115, a store server 155 and a bar code 145 printed on a label 150. The image scanner 115 communicates with the store server 155 over a computer data network 160. The network 160 can be a wired network (e.g., an Ethernet network) or wireless network (e.g., an IEEE 802.11G based network) or a combination of both. In some embodiments, the store server 155 is physically removed from the store where the image scanner 115 is located and communicates with the image scanner 115 over the Internet or a wide area network or a combination of these or different types of networks. In some embodiments, multiple image scanners 115 communicate over the data network 160 to the store server 155.

The image scanner 115 includes an image-focusing device 125 that receives an image and focuses the image onto an image capture device 120. The image scanner 115 is further comprised of a processing module 130, user interface hardware 140, and communications hardware 135. The processing module 130 comprises at least one processor, memory, stored instructions and control and interface hardware to control the other devices and modules of the image scanner 115. The processing module 130, by executing the stored instructions, controls the hardware devices and modules that comprise the image scanner 115 or are connected to the image scanner 115. In addition, the stored instructions cause the processor to: process data such as an image that is captured by the image capture device 120, control the communications hardware 135 to implement protocols used on the data network 160 and implement other software features and functions of the image scanner 115. In some cases, the store server 155 sends the image scanner 115 updates to the stored instructions or to the operating parameters of the image scanner 115.

Figure 2B:
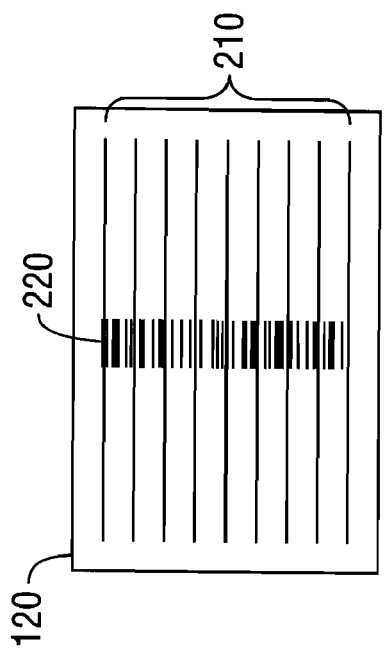
FIGS. 2B, 2C and 2D are illustrations of a bar code focused onto an image capture device.
Figure 2D:
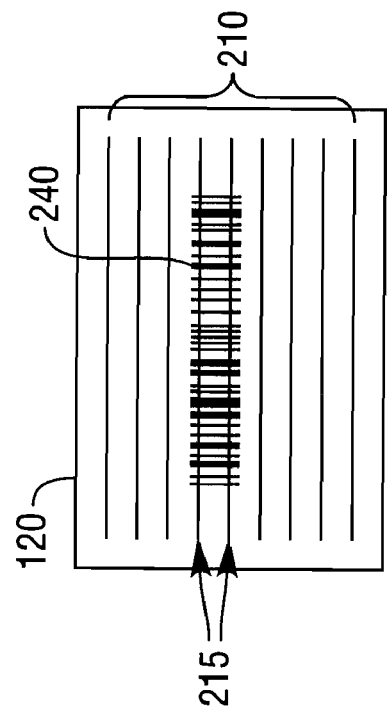
Figure 2A:
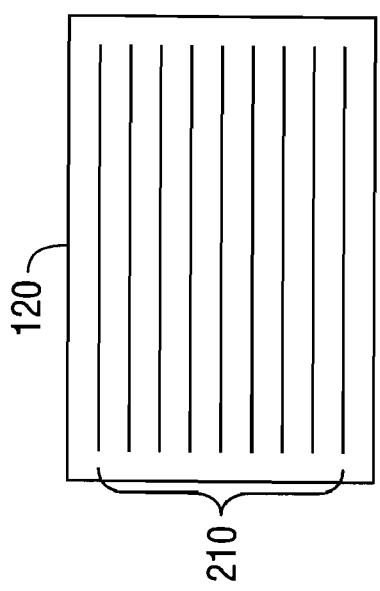
FIG. 2A is an illustration of an image capture device.

FIG. 2A is a simplified illustration of an image capture device 120. The image capture device 120 is responsible for converting an optical image focused on the surface to of the image capture device 120 to a digital image. The image capture device 120 is comprised of thousands of photo detectors. Each photo detector produces an electric signal that is proportional to the amount of light energy striking the photo detector. The output of each photo detector represents one pixel that is used to construct an electronic digital image that represents the image focused onto the surface of the image capture device 120. The pixels of the image capture device 120 are organized into rows as represented by the subset of pixel rows 210. Pixels forming the captured image are read serially one row at a time from the image capture device 120.

This embodiment uses a five mega-pixels CMOS sensor as the image capture device 120. The CMOS sensor is organized into 1,944 rows where each row has 2,592 pixels. Other embodiments use image capture devices that can have a greater or lesser numbers of pixels and use technologies other then CMOS (e.g., CCD sensors) to create an image capture device.

The image capture device 120 captures an optical image focused on it surface and converts it to an electronic digital image. The digital image is then read from the device 120 one row at a time, one pixel at a time. The time required to read all of the raw data from the image capture device 120 is relatively long compared to the time required to simply capture the digital image in the image capture device 120. In addition, once the data for the digital image is read from the image capture device 120, the data must still be processed to determine if a bar code is present. If a bar code is found, the bar code information is recovered by analyzing the number and width of the bars and spaces that make up the bar code.

Some captured images will contain an image of a bar code and while others captured images will not. When a bar code is present in a captured image, the number of pixels used to represent the actual bar code account for only a small percentage of the overall pixels that make up the entire captured image. U.S. patent application Ser. No. 11/470,645 filed Sep. 7, 2006, teaches that it is possible to reduce the number of pixel rows read from am image capture device and still be able to detect and recover information about a bar code captured in a digital image. In some embodiments, only 8% to 10% of the actual pixel rows from the image capture device 120 are needed to recover a bar code. Reducing the number of pixel rows 210 read from the image capture device 120, reduces the total time needed to download the captured digital image thus freeing up time that can be used to process the pixel data that is read. However, reading too few of the pixel rows 210 can cause a bar code to be missed.

The orientation of a bar code image that is focused on the image capture device 120 to the pixel rows 210 of the image capture device 120, has a direct effect on whether the bar code can be detected and how many pixel rows 210 must be read before the bar code to be detected. Certain orientations of the bar code image to the pixel rows require more pixel rows 120 of data and more complex analysis algorithms, which increase the download time and the processing time needed to recover the bar code information, before they can be detected. When using less than all pixel rows of the image capture device 120 to process a digital image and recover the bar code information, the orientation of the bar code will have a major impact on the ability to detect and recover the bar code information. In some cases, it will not be possible to read the bar code because the orientation of the bar code combined with the reduced number of downloaded pixel rows 210 cause one or more of the bars and or spaces that make up the bar code to not be represented in the downloaded pixels data. This is illustrated below. A failure to read a bar code is more probable as the orientation of the bar code approaches a 90 degrees angle to the pixel rows 210 of the image capture device 120 and the percentage of pixel rows read from the image capture device 120 is small.

FIG. 2B is an illustration of an image capture device 120 with a bar code image 220 of the bar code 145 focused onto the image capture device 120. The bar code image 220 is orientated at a 90 degrees angle to the pixel rows 210 of the image capture device 120. (The lines in the bar code 145 are parallel to the pixel rows 210 of the image capture device.) The sampled pixel rows 210 represent less than all the pixel rows in the image capture device 120. Since only the sampled pixels rows 210 are read from the image capture device 120, some of the bars and spaces that comprise the bar code image 220 are not captured by the pixels in the sampled pixel rows 210 and will be not be represented in the image that is processed to detect and recover the bar code information. The missing features of the bar code 220 will prevent the image scanner 115 from detecting and reading the bar code 145. Therefore, the orientation of the bar code image 220 to the image capture device 120 has a direct effect on the image scanner's 115 ability to detect and recover bar code information.

Figure 2C:
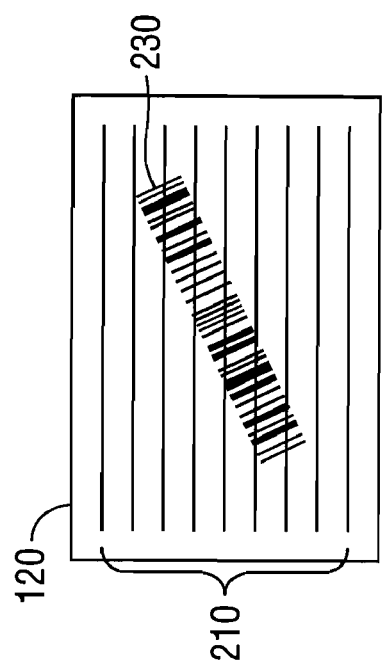

The negative effects resulting from poor bar code orientation can be overcome by either increasing the number of pixel rows 210 read from the image capture device 120 or by changing the orientation of the bar code to the image capture device 120. Increasing the number of pixel rows read from the image capture device 120 also increases the time needed to download the additional pixel rows 220 from the image capture device 120 and it increases the time needed to process the additional data. This reduces the number of images that can be processed per second and thus places additional limits on the pass-by speed of the bar code. The other option is to rotate the bar code image so that it is orientated at or near an angle of zero degrees to the image capture device 120. This orientation will result in the fewest number of pixels rows needed to read the bar code 145. FIGS. 2C and 2D illustrate this point.

FIG. 2C is an illustration of an image capture device 120 with an image 230 of the bar code 145 focused onto the image capture device 120. The bar code image 230 is orientated at a 30-degree angle to the pixel rows 210. It can be seen that all the bars and spaces of the bar code 230 are captured in the pixel data from the sampled pixel rows 210. This case requires five pixel rows to capture all the elements of the bar code 230. No single pixel row captures all the elements of the bar code 230. However, the bar code 230 will still be detected and the bar code information recovered but multiple rows 210 of pixel data will have to be processed. While the image scanner 115 will be able to read the bar code 145, this orientation will required a more complex analysis and more processing time.

FIG. 2D is an illustration of an image capture device 120 with an image 240 of the bar code 145 focused onto the image capture device 120. The bar code image 240 is orientated at approximately a 0 degree angle to the pixel rows 210. All the elements (i.e., bars and spaces) of the bar code 145 are captured by the pixels of at least a single pixel row and in this case, two of the sampled pixel rows 215 captured all the elements of the bar code. Therefore, once it is determined that at least a one pixel row has captured all elements of the bar code 240, the bar code 240 can be quickly decoded by processing only the data from the one pixel row. The optimal orientation for processing a bar code occurs when at least one pixel row contains image data for all elements (i.e., bars and spaces) of the bar code. A person of ordinary skill in the art will understand that the orientation of the bar code image 240 to the image capture device 120 can deviate from a 0 degree angle and still allow at least one pixel row to contain image data for all elements of the bar code. The maximum deviation in the orientation of the bar code from a 0 degree angle will vary based on several factors including the height and width of the bar code and the percentage of pixel rows 210 read for analysis.

Figure 3:
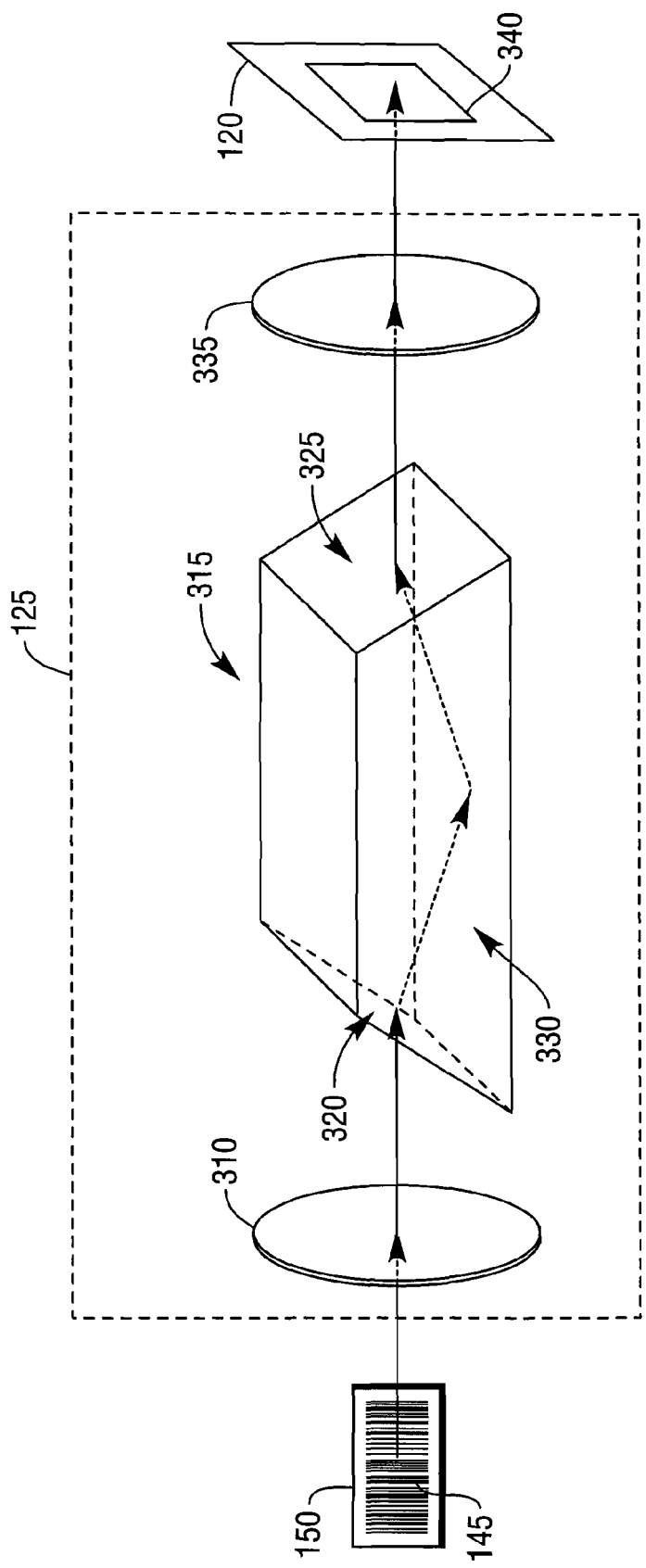
FIG. 3 is an illustration of an image-focusing device incorporating a dove prism.

FIG. 3 is an illustration of one embodiment of an image-focusing device 125, which is responsible for focusing an image 340 of the bar code 145 onto the surface of the image capture device 120. The image-focusing device 125 comprises a dove prism 315 and two optical lenses 310 and 335. A dove prism is a type of reflective prism that produces an inverted image. In a dove prism, when a bean of light (representing a image of the bar code 145) enters a sloped face 320 of the prism 315, it is bent toward the longest or bottom face 330, which internally reflects the beam to a second sloped face 325 where the beam exits the prism. A dove prism has an additional property that allows the prism to rotate an image transmitted through the prism at twice the rate that the prism is rotated. For example, if a dove prism is rotated 45 degrees, the image exiting the prism will be rotated 90 degrees. The optical lenses 310 and 335 are used to focus the image both before and after the image passes through the dove prism. In some embodiments, the optical lenses 310 and 335 may comprise more than one optical lens. In addition, the optical lenses 310 and 335 maybe movable so as to change the focal distance of the image being focused on the image capture device 120.

Changing the focal distance increases the field of view of the scanner 115.

To achieve the proper orientation between the image 340 of the bar code 145 being focused on the image capture device 120 and the pixel rows of the image capture device 120, all or part of the image-focusing device 125 is rotated. In the instance embodiment, the dove prism 315 is rotated about its longitudinal axis (the longitudinal axis is parallel to the bottom face 330 of the dove prism 315) which causes the image 340 focused on the image capture device 120 to rotate at twice the rate of the prism's rotation. As the image 340 focused on the image capture device 120 is rotated, the image capture device 120 captures multiple images. Each captured image is then analyzed to determine if the bar code in the image is properly orientated so that it can be decoded by using just one pixel row. If the image 340 is not properly orientated, it is discarded and the next image is analyzed. When analysis of a capture image shows the bar code image 340 is properly orientated, the captured image is further processed to recover the bar code information. In other embodiments, the bar code image will be considered optimally or properly orientated even when more than one of the subset of pixel rows 210 is required to decode the bar code. Once decoded, the bar code information is transmitted to the store server 155 over the network 160.

In some embodiments, all or part of the image-focusing device 125 is continuously rotated. In other embodiments, all or part of the image-focusing device 125 is rotated in one direction for up to one revolution and then rotated in the reverse direction for up to one revolution. In still other embodiments, the image-focusing device 125 does not rotate but the image capture device 120 rotates instead. It does not matter which device or devices are rotated to achieve the proper orientation of the bar code image 340 to the image capture device 120.

In the instance embodiment, a dove prism 315 is used in the image-focusing device 125 because when a dove prism is rotated, the image passing through the prism is rotated at twice the rate of rotation as the prism. Rotating ordinary concave or convex lenses would not cause an image passing through the lenses to rotate. While concave or convex lenses are needed for focusing, an additional device is needed that can rotate an image passing through it. A person of ordinary skill in the art will understand that many other devices have this type of property and can be used in place of the dove prism 315. Furthermore, it is not a requirement that the rate of rotation of an image transmitted image through a device be different from the rate of the rotation of the device.

Figure 4:
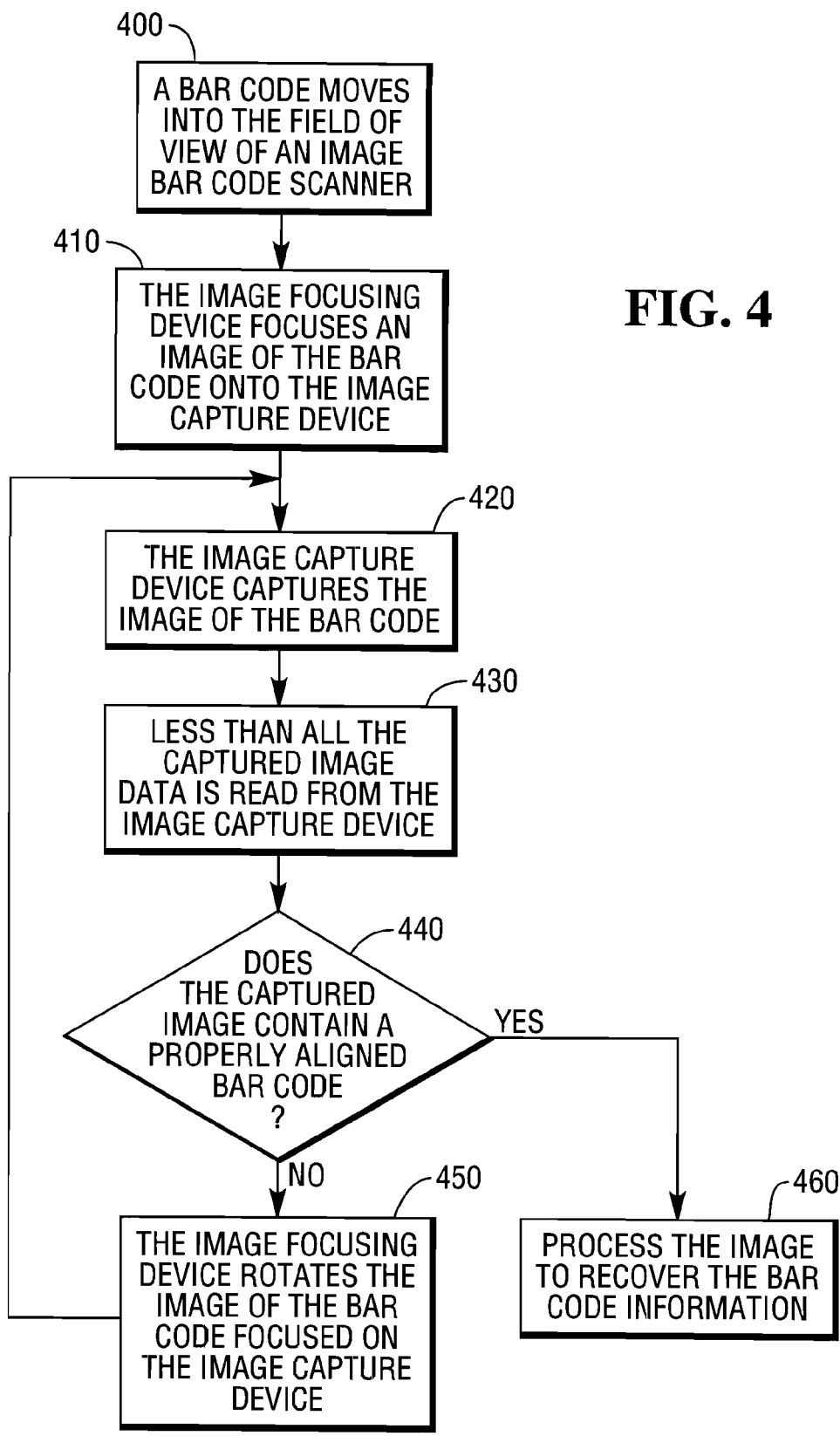
FIG. 4 is a high level flow diagram illustrating a method of reading a bar code.

Now turning to FIG. 4, there is presented a high level flow diagram that provides one method used by an imaging bar code scanner 115 to read a bar code 145. In step 400, a bar code 145 is moved into the field of view of an image bar code scanner 115. The field of view for a scanner is an area proximate to the scanner where the image-focusing device 125 will focus an image 340 of any object onto the scanner's image capture device 120 with sufficient clarity to determine certain characteristics of the object. In step 410, the image focusing device 125 focuses an image 340 of the bar code 145 onto the surface of the image capture device 120. In some embodiments, image-focusing device 125 has a fixed focal length. In other embodiments, the focusing components 310, 335 of the image-focusing device 125 are movable so that the focal length can be varied. The components 310, 335 may each comprise multiple optical components. Changing the focal length will enlarge the field of view for the scanner 115. In step 420, the image capture device 120 captures the image 340 that is focused on it which contains the image of a bar code 145. In step 430, less than all the captured image data is read from the image capture device 120. Image capture devices 120 can capture millions of pixels where each of the pixels represents a small portion of the data that makes up the captured image. Reading all of the data from the image capture device take a relatively long time when compared to the time needed to capture the data. Therefore, reading less than all the data reduces the overall time needed to process the image. In step 440, an analysis is made on the data of the captured image to determine if it contains a properly aligned image of the bar code 145. In this analysis, the data from certain rows 210 of the captured image are processed to determine if all the bars and spaces of an entire bar code have been captured in by at least one pixel row. If a bar code has been captured, the data is further processed in step 460 to recover the bar code information. If a bar has not been properly captured, control passes to step 450, where the image focusing device 125 rotates the image of the bar code 145 that is focused on the image capture device 120. Control is then passed to step 420.

The rotation angles at which the images 340 are captured can be fixed, varied, or dynamically adjusted/varied. For example, in an embodiment where the image-focusing device 125 continuously rotates, selecting a fixed rotation angle of 22.5° will cause eight (180°/22.5°) unique images to be captured, with each captured image at 22.5° inclination away from its 2 adjacent captured images. An example of capturing images at varied rotational angles would be to capture images at angles of 8°, 29°, 16°, 29°, 16° . . . . These angles are selected to increase the probability of having the scanner successfully read bar code labels that are oriented horizontally, vertically, and/or at 45° inclination which are the three most common inclination angles for bars being read. An example of capturing images using dynamically varied rotation would be to vary the angles by determining and then adapting to the habits of the operator. Based on previous successful bar code reads, it is determined that the operator drags a bar code at approximately 10° counter-clockwise, the sequence of the angles can be dynamically adjusted to compensate for the rotation introduced by the operator. The scanner may even individually adjust each angle within a single revolution if the situation warrants.

In some embodiments, the bar code information is transmitted over a network 160 to a store server 155. The store server 155 retrieves additional information about the bar code 145 from a database and records that the bar code 145 has been read. Some or part of the additional information about the bar code 145 is returned to the scanner 115 to be displayed using the user interface hardware 140. The scanner 115 will also use the user interface hardware 140 to provide operational feedback (i.e., a successful or unsuccessful read) to the operator that is using the scanner 115.

In other embodiments, the image-focusing device 125 remains fixed while the image capture device 120 is rotated. The end result is the same, in that the image 340 of the bar code 145 being focused on the image capture device 120 is rotated.

In some embodiments, more than one image capture device 120 is present and used to capture images. In these embodiments, the image-focusing device 125 produces multiple images 340 of an original image and directs one of the produced images to each of the image captures devices. The image 340 focused on each image capture device 120 is at a different orientation angle. The result is that each captured image is rotated to a different angle than the other captured images. Having multiple image capture devices 120 allows for parallel processing of a source image at different angles.

Since the image-focusing device produces multiple images at one time, it is not necessary for the image-focusing device 125 to rotate through the full range of movement. For example, if the image-focusing device produces two images, where one image is rotated 90 degrees from the other, the image-focusing device would only have to rotate 90 degrees to produce images that represented 180 degrees of rotation (all that is needed to read a bar code). If a Dove prism is used, the image-focusing device would only have to rotate 45 degrees because an image reflected through a Dove prism rotates at twice the angle of the prism. In some embodiments, there maybe a sufficient number of image capture devices so that no movement of any component is needed to capture at least one image that is properly oriented.

In some embodiments, more than one image-focusing device 125 is used to focus an image onto one or more image capture devices 120. In some embodiments where there is only one image capture device 120, multiple image-focusing devices 125 will alternately focus an image onto the image capture device 120. This allows images from different areas to be focused onto the image capture device 120 thus increasing the field of view of the scanner 115 and the probability of reading a bar code 145 passing by the scanner 115. In cases where there are multiple image capture devices 120, each image capture device 120 has an image focused on it that is different from the images focused on the other image capture devices 120. This allows for parallel capture and processing of different images.

In still other embodiment, the imaging bar code scanner 115 is used to read optical codes other than bar codes. Optical codes such as text and symbols are also readable by the imaging bar code scanner 115.

While the invention is disclosed in the context of a retail image bar code scanning embodiment, it will be recognized that a wide variety of implementations may be employed by a person of ordinary skill in the art consistent with the above discussion and the claims, which follow below.

What is claimed is:

1. A computer implemented method for use in an image scanner reading an optical code, the method comprising:
    focusing an image onto an image capture device using an image focusing device;
    capturing the image using the image capture device;
    determining if the optical code is present and at an optimal angle in the captured image;
    when the optical code is not present at an optimal angle, rotating the relative angle of the image focused on the image capture device; and
    when the optical code is present at an optimal angle, processing the captured image to recover the optical code.

2. The method of claim 1, further comprising reading less than all the captured image data from the image capture device.

3. The method of claim 2, wherein less than all the captured image data is used to determine if an optical code is present in the captured image.

4. The method of claim 1, where the image focusing device comprises an image rotation device adapted to rotate the image focused on the image capture device.

5. The method of claim 4, where the image rotation device is a dove prism.

6. The method of claim 4, where the image rotation device is a multifaceted cylindrical mirror.

7. The method of claim 1, where the image capture device is rotatable.

8. The method of claim 1, where the optical code is a bar code.

9. An image scanning apparatus for reading an optical code, the apparatus comprising:
    an image capture device;
    an image focusing device for focusing an image onto the image capture device; and
    a processor module configured to read a captured image from the image capture device, determine if the optical code is present at an optimal angle in the captured image and when the optical code is present at the optimal angle, processing the captured image to recover the optical code and when the optical code is not present at an optimal angle, rotating the relative position of the image focused on the image capture device.

10. The apparatus of claim 9, where processor module reads less than all of the captured image from the image capture device.

11. The apparatus of claim 9, where the image focusing device included an image rotation device.

12. The apparatus of claim 11, where the image rotation device is a dove prism.

13. The apparatus of claim 11, where the image rotation device is a multifaceted cylindrical mirror.

14. The apparatus of claim 9, where the image capture device is rotatable.

15. The apparatus of claim 9, where the optical image is a bar code.

16. An image scanning system for reading and processing an optical code, the system comprising:
    a store server computer;
    a network connected to the store server computer;
    an image scanner comprising:
        an image capture device;
            an image focusing device for focusing an image onto the image capture device; and
        a processor module configured to read a captured image from the image capture device, determine if the optical code is present at an optimal angle in the captured image and when the optical code is present at an optimal angle, processing the captured image to recover the information from the optical code sending the information over the network to the store server and when the optical code is not present at an optimal angle, rotating the relative angle of the image focused on the image capture device.

17. The system of claim 16, where processor module reads less than all the captured image from the image capture device.

18. The system of claim 16, where the image focusing device comprises an image rotation device.

19. The system of claim 18, where the image rotation device is a dove prism.

20. The system of claim 18, where the image rotation device is a multifaceted cylindrical mirror.

21. The system of claim 16, where the image capture device is rotatable.

22. The system of claim 16, where the optical code is a bar code.

* * * * *